United States Patent
Watson (10) Patent No.: US 9,830,649 B2
(45) Date of Patent: Nov. 28, 2017

(54) ON-LINE SAVINGS ACCOUNT

(71) Applicant: PAYPAL, INC., San Jose, CA (US)

(72) Inventor: Michael Watson, Lincoln, NE (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/798,330

(22) Filed: Jul. 13, 2015

(65) Prior Publication Data

US 2015/0317727 A1    Nov. 5, 2015

Related U.S. Application Data (63) Continuation of application No. 12/638,842, filed on Dec. 15, 2009, now abandoned.

(51) Int. Cl.

| *G06Q 30/00* | (2012.01) |
|---|---|
| *G06Q 40/02* | (2012.01) |
| *G06Q 40/06* | (2012.01) |
| *G06Q 10/00* | (2012.01) |
| *G06Q 20/10* | (2012.01) |
| *G06Q 30/06* | (2012.01) |

(52) U.S. Cl.
CPC ............ *G06Q 40/02* (2013.01); *G06Q 10/00* (2013.01); *G06Q 20/108* (2013.01); *G06Q 30/00* (2013.01); *G06Q 30/0631* (2013.01); *G06Q 30/0643* (2013.01); *G06Q 40/06* (2013.01)

(58) Field of Classification Search
CPC .............................. G06Q 30/00; G06Q 40/02
USPC ............................................. 705/26, 27, 42
See application file for complete search history.

(56) References Cited

U.S. PATENT DOCUMENTS

| 6,164,533 | A | 12/2000 | Barton | |
|---|---|---|---|---|
| 6,173,269 | B1 | 1/2001 | Solokl et al. | |
| 6,631,358 | B1 | 10/2003 | Ogilvie | |
| 7,945,512 | B2 * | 5/2011 | Scipioni | G06Q 20/04 705/30 |
| 2002/0143680 | A1 | 10/2002 | Walters et al. | |
| 2003/0120572 | A1 * | 6/2003 | Coventry | G06Q 40/00 705/35 |
| 2005/0222951 | A1 * | 10/2005 | Sherman | G06Q 40/02 705/40 |
| 2007/0011089 | A1 | 1/2007 | DeSchryver | |
| 2007/0027736 | A1 | 2/2007 | Reynolds et al. | |
| 2007/0198382 | A1 | 8/2007 | Ferrari | |
| 2007/0255658 | A1 | 11/2007 | Grad | |
| 2008/0228637 | A1 * | 9/2008 | Scipioni | G06Q 20/04 705/39 |
| 2011/0145109 | A1 * | 6/2011 | Watson | G06Q 10/00 705/27.2 |

OTHER PUBLICATIONS

SmartyPig: Internet Archive Wayback Machine—archive.org; smartypig.com; Apr. 4-9, 2009; 15pgs.*

(Continued)

*Primary Examiner* — Rob Pond
(74) *Attorney, Agent, or Firm* — Haynes and Boone, LLP (57) ABSTRACT

An on-line savings page for managing a savings account includes a list of items the user is saving for, where each item has a specified priority. A savings rate for each item is determined by the savings account based on the priority and total savings rate. The user is notified of any changes in the savings account, such as price changes, inventory changes, etc., as well as relevant information related to the item, such as sales, offers, recalls, etc.

20 Claims, 5 Drawing Sheets

(56) References Cited

OTHER PUBLICATIONS

BW: "Achieving Savings Goals Just Became Easier with Wells Fargo's Newest Online Personal Finance Tool—My Savings Plan," Business Wire, Nov. 16, 2006; ProQuest Dialog #154482992, 4pgs.*
IIWN: "SmartyPig; Just in Time for the Holidays: Savvy Shoppers Can Now Earn up to 12% in Cash Incentives by Saving with SmartyPig," Investment Weekly News; Dec. 5, 2009; ProQuest Dialog #200894347, 4pgs.*
Tode, Chantal: "Layaway returns to retailers—on the Web," DM News, Oct. 26, 2009; ProQuest Dialog #215047243, 4pgs.*
DealAlerter: Internet Archive Wayback Machine—archive.org; dealalerter.com; Sep. 1, 2008; 4pgs.*
Wells Fargo, "My Savings Plan" [online] [Retrieved on Jul. 14, 2016] <URL: https://www.wellsfargo.com/online-banking/my-money-map/my-savings-plan/>

* cited by examiner

ON-LINE SAVINGS ACCOUNT

CROSS-REFERENCE TO RELATED APPLICATION

This application is a continuation of and claims priority to U.S. patent application Ser. No. 12/638,842, filed Dec. 15, 2009, which is incorporated herein by reference in its entirety.

BACKGROUND

Dependents, employees, business associates, family members, and others may have a difficult time with disciplined adherence to a budget, saving for specific items in the long-term, appropriately prioritizing spending, spending habits, and money management in general. Often, money is spent spontaneously such that there is often not enough money left in a budget to buy high priority items. Many are then forced to go over budget and borrow money or take out lines of credit to pay for these high priority items. In most instances, paying back the funds borrowed or taken out on credit may be difficult, expensive, and prolonged. Existing money management systems may be too conceptual, too expensive, or too restrictive.

Also, it is often that consumers have multiple items they are saving for. Without proper management, lower priority items may take precedence over higher priority items, such as when the consumer saves enough for a lower priced, lower priority item, the consumer may purchase that item instead of saving a bit longer for the higher priority item.

Furthermore, when a savings goal is reached, the consumer may not be able to easily locate that item for purchase. This may occur if when the item was first identified from a particular seller or merchant, that seller or merchant either is no longer in business or no longer has that item available when the consumer is ready to make the purchase. The consumer is then required to search for the item, resulting in inconvenience as well as the possibility that the item now requires more money than what the consumer saved for.

Therefore, there is a need for a way for consumers to better save for multiple purchases without the disadvantages with conventional methods above.

SUMMARY

According to one embodiment, a savings account is provided to a user, such as by a payment provider, where the user may search for items from the savings account page, add found items, add generic item descriptors (such as Hawaii Vacation), set priorities for the items, automatically allocate funds based on priority, manually set fund allocations, and purchase an item once the price or goal has been reached by simply selecting a link. In other embodiments, the savings account may show the user trends in the price of selected items (e.g., upward, downward, or flat), updates merchants or retailers offering the item at the lowest price, special deals on the selected items or related items, updates on when an item is becoming low in stock or may be discontinued (such as when a new model is to be introduced), re-allocate funding amounts after one or more updates (such as to priority, price, etc.), and/or provide a list of merchants having the item in stock. Pictures of items may also be displayed on the savings account page, as well as progress indications of the savings for each item.

Funds for the savings account may be obtained from the payment provider, a user's bank, a user's credit card, or other funding source. The user may also directly transfer funds to a particular item in the savings account. When a goal or price target is reached, the user may be notified, such as by email or text. The user may then click on a link to be re-directed to the user's savings account or to a merchant offering the item at the lowest price or at the target price. The user may also access savings account through a standard Internet browser application. Links on the savings account enable the user to select a link or choose from a list of comparable merchants for the item. The user may then make the purchase with funds being transferred from the user's savings account with the payment provider to a merchant account.

These and other features and advantages of the present invention will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
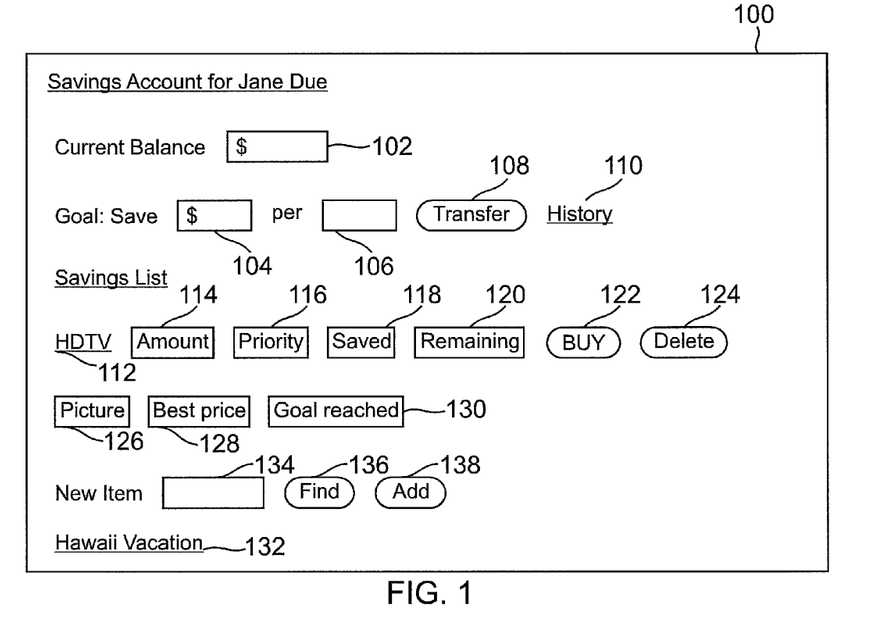
FIG. 1 shows an on-line savings account page according to one embodiment.

FIG. 1 shows a savings account page 100 according to one embodiment. Savings account page 100 may be provided to a user through a payment provider, such as PayPal, Inc. of San Jose, Calif. Savings account page 100 may be presented to the user on a display screen of a smart phone, laptop computer, desktop computer, television screen, or other suitable device. The user may access savings account page 100 by first logging into the user's account with the payment provider, such as entering in a user name and password/PIN. The user's savings account may be a separate account for other account(s). For example, the user may have a primary account and a savings account, where the savings account is accessed by clicking on a tab or other suitable method.

Once savings account page 100 is displayed, the user may view, add, revise, and/or edit as needed numerous fields and data. The various fields and data may differ in various embodiments. In this example, savings account page 100 includes a current balance 102 that provides the user with how much money is currently available in the user's savings account. This may be updated each time funds are used or transferred in. A periodic savings rate allows the user to see an amount saved 104 each period 106, e.g., weekly, bimonthly, monthly, etc. Amount saved 104 may be manually entered by the user, based on the frequency of savings rate. Period 106 may be manually entered as well, but the user may also be provided with a drop-down list of standard time periods. In other embodiments, amount saved 104 is automatically calculated and filled by the payment provider, based on different user inputs, such as the cost of an item being saved for, priorities for each item, and a target date to reach the savings goal for each item. Simple algorithms may be used to calculate the amount needed to be saved each month based on these various inputs.

Once the amount and frequency are set, the specified amount may be automatically deposited into the user's savings account on the designated days. The user may select a funding source, such as a bank account, a debit card, a credit card, or a separate account with the payment provider. The funding source may be changed and may comprise a plurality of sources. In one embodiment, amount saved 104 may be obtained through more than one funding source, with specific allocations from each funding source set by the user. For example, if the amount saved each period is $200, $100 may be taken from the user's checking account, $75 from the user's savings account at a bank, and $25 from the user's account at the payment provider.

Savings account page 100 may also include a transfer button or link 108 that enables the user to directly transfer funds at any time. By selecting transfer button 108, such as by tapping or clicking on it, the user can process a one-time transfer of funds into the user's savings account. This may be accomplished in any conventional method, such as direct links with a funding source, logging into the funding source, and/or specifying the amount of transfer. If the funding source is with the same payment provider, the user may simply need to enter in an amount to be transferred and a date of transfer. This feature enables the user to add additional funds to the account as needed, such as when the user has additional funds to contribute, the user desires to reach a savings goal sooner, etc. A history button or link 110 provides the user the option of seeing a history of transfers or deposits into the savings account, along with information about any purchases made with the savings. This may be shown as a graph, table, or any suitable format, on a different page or overlaid on savings account page 100.

A portion of savings account page 100 may include a listing of items the user is saving for. In this example, three items are shown for illustration only, as any practical number may be possible. The listing may include a written description 112, referring to a specific item or product. As used herein, item or product may also include services. The listing may then include other information about the item or savings such as an amount 114, a priority 116, an amount saved 118, a percentage of the amount saved 120, a purchase button 122, and a delete button 124. Other types of information may also be suitable.

Amount 114 may be the price of item 112 at a specific merchant at the time the item is listed, an average price of the item from a set of merchants, the current price of the item, or a price set by the user. Thus, in some embodiments, amount 114 may change as the price of item 112 changes, either on average or with a specific merchant.

Priority 116 is used to indicate the importance or priority of the different items in the user's savings account, where the user desires to be able to purchase higher priority items before lower priority items. The priority may be entered by the user, selected by the user from a drop-down menu, or assigned by the system in any suitable format. For example, the priority may be a number ranging from one to the total number of items being saved for, with each item associated with a unique number. In another example, the system may provide the user with a limited set of numbers, such as 1, 2, 3, or 4, in a drop down menu, with 1 being the highest priority and 4 being the lowest priority. Priority may also be with letters, such as H (high), M (medium), and L (low). Based on the user-selected priorities, a savings plan may be established.

In one embodiment, the user may set a savings amount for each item per savings period from amount saved 104 and period 106. For example, if the user is saving $200 each month and the user is saving for three items, the user may set aside $100 for the highest priority item, $60 for the middle priority item, and $40 for the lowest priority item. Amounts may be changed throughout and may depend on the prices of each item. For example, if a low priority item costs the most and the highest priority item costs the least, the user may put aside less for the high priority item, while still being able to purchase the high priority item first.

In another embodiment, the system or payment provider sets the savings amount automatically, based on the priorities, total dollar amount saved, and number of items. This automatic allocation can be determined using any suitable methodology, such as a weighted percentage based on priority, without considering the costs of each individual item or time desired to reach a savings goal. In this example, items are ranked by the user as H, M, or L priority, with H given a weight of 0.6, M a weight of 0.3, and L a weight of 0.1. The system first determines how many items are within each priority and then determines the amount saved for each item based on the following: For each high priority item, money saved is equal to T*H/NH, for each medium priority item, money saved is T*M/NM, and for each low priority item, money saved is T*L/NL, where T is the total dollar amount saved each period, NH is the number of high priority items, NM is the number of medium priority items, and NL is the number of low priority items. Algorithms based on additional data may also be used, such as price of the items and desired time to reach a target price.

Referring back to FIG. 1, amount saved 118 shows the user how much has been saved for the particular item. Percentage of amount saved 120 indicates how close the user is to reaching amount 114 represented as a percentage, where 100% indicates the savings goal has been reached. Once the saving goal has been reached, purchase button 122 may be selected, such as by clicking or tapping, to enable the user to purchase item 112. For example, selecting purchase button 122 may re-direct the user to a merchant site or on-line shopping site, such as eBay, where the user may purchase the item.

Delete button 124 enables the user to remove item 112 from the savings account at any time. If funds have already been allocated or saved for that item, selecting delete button 124 may re-distribute funds allocated for the item to the remaining items. This re-distribution can be done in many different ways. In one embodiment, the funds are equally distributed to the remaining items. In other embodiments, the user can select where the funds are re-distributed, the system distributes based on the algorithm used to initially allocate savings as discussed above, or distribute first to items of highest priority and any remaining funds to items of the next lower priority. Alternatively, funds from a deleted item may be transferred back to a user account.

Savings account page 100 may provide the user with additional or alternative fields and data. In one embodiment, item 112 may be represented by a picture 126 of the item, either in conjunction with or in place of a written description. A current best price 128 may provide the user with updated cost information about the item. For example, the system may periodically update the cost of the item with the current best price, which may be from a specific merchant or on-line shopping site. This gives the user a more accurate idea of when a savings goal can be reached. For example, a targeted savings goal for a specified item may be less than what is currently needed to purchase the item if the price for the item has come down. A date field 130 indicates to the user when the user is expected to save enough money to be able to purchase the selected item, based either on the current best price or the targeted savings goal. The date in date field 130 can be determined by simple algorithms based on the rate of savings and the desired savings amount. The date may be changed whenever any relevant parameter changes, such as rate of savings, price of item, or savings goal.

In addition to specifying a specific item, such as shown in written description 112 or picture 126, the user may wish to save for unusual or personal items, such as a trip or vacation to Hawaii. Such an item may include flight, hotel, car rental, or any combination that the user wishes to include in savings for the Hawaii vacation. Consequently, savings account page 100 may include a descriptor field 132 that allows the user to enter a description of the savings item. The user may simply click on field 132 and type in the item description, where in this example, the user enters "Hawaii Vacation." One or more of the various fields described above may be associated with this entry and therefore are not shown in the figure for clarity.

Savings account page 100 may also include a search field 134, in which the user may enter an item to search for. This is similar to search fields for various Internet browsers, on-line sites, etc. Once the user enters in a word or words for the item in search field 134, the user may select a find or search button 136 to begin a search for the item. The search may be linked to a particular merchant or shopping site (such as eBay). Once found, the user may add an item to the list, such as by selecting an add button 138. This may also populate fields with a current or best price, a photo, etc. In one embodiment, the user may bypass search button 136 and just select add button to add the descriptor to the savings list, e.g., "Hawaii Vacation."

Figure 2:
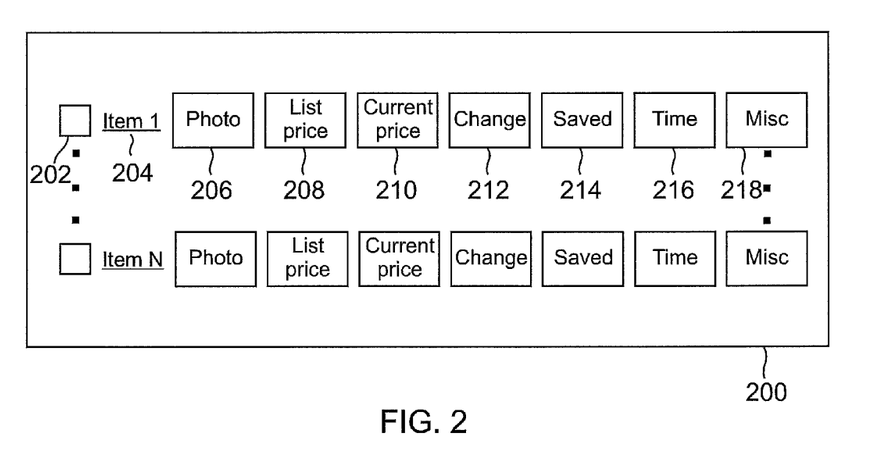
FIG. 2 shows an on-line savings account page according to another embodiment.

FIG. 2 shows another embodiment of a savings account page 200, which can be accessed through the user's payment provider account or other suitable means, such as described with respect to FIG. 1. Once accessed, the user can view savings account page 200 on a display screen of a user device, such as a smart phone, a PC, or other computing device. Savings account page 200 includes a priority box 202 that allows the user to assign a priority to the corresponding item, such as by entering in a number from 1 to N, where N may be the number of items being saved for or a number less than the number of items being saved for. Priorities may be re-allocated at any time by the user changing the priority number of an item.

A written item descriptor 204 and/or a photo 206 describes the item. Descriptor 204 and/or photo 206 may also contain a link that allows the user to select (such as roll over or tap) or click on the link for additional information about the item. For example, one or more of the following may be provided to the user: a more detailed description of the item, a list of merchants offering the item, along with prices, the merchant with the best current price for the item, one or more local merchants offering the item, etc. The user may be re-directed to a different screen or shown on the same screen as an overlay.

A listing price 208 may show the price of the item when the user added the item to savings account page 200, which may be useful in determining the initial savings rate for the item. A current price 210 shows the user the current amount for the item. This current price may be the "best" or lowest price or the current price from a particular merchant There may be situations where the original price increases (e.g., high demand/low supply) or decreases (e.g., new model/version coming out, low demand/high supply). A change field 212 provides the user with a dollar amount or percentage change from the current price to the original price. This number if positive if the price of the item has increased and negative if the price has decreased. Change field 212 can give the user a sense of whether the user should try and buy the item sooner (such as a low current price that is attractive to the user or a trend upward where the user wants to make the purchase before the price goes up more) or remove the item (if the price has gone too high). An amount saved field 214 shows the user how much has been saved for that particular item, such as described with respect to FIG. 1.

A date or time field 216 shows when the savings goal is expected to be reached, based on the item price and savings rate. Field 216 may be a date or a number, such as X months and Y days. The date or number may be based on the current price or the original price. Field 216 may also be selected to manually change the date or number. For example, if the user wishes to purchase the item on an earlier date or in less days, the user can enter the new date or number to re-allocate savings. In one embodiment, the overall savings may be increased and/or the savings rate for one or more other items may be reduced (either by the user or the system). A general field 218 may be used to provide various information about the item to the user. Examples include any "hot" deals, low inventory, sales, local sales, related items, coupons, etc. One or more of the above may be represented in separate and individual fields or only in general field 218. These various types of information may allow the user to make a more informed decision whether to continue saving for the item, increase savings for a quicker purchase, decrease savings for a slower purchase, save for or make additional purchases related to the item, etc. This may also be advantageous to merchants, who can market more directly to an interested consumer.

Figure 3:
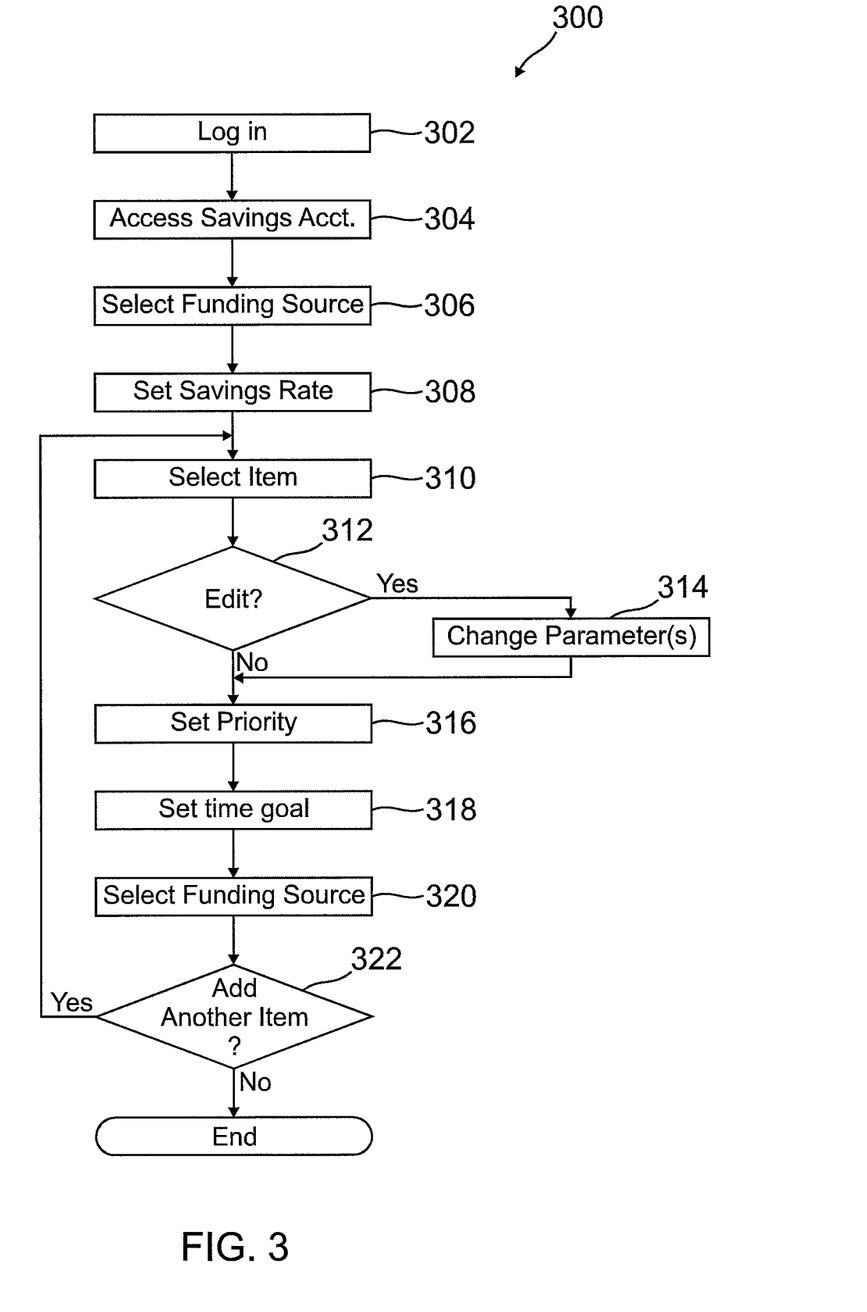
FIG. 3 is a flowchart showing a process for setting up or changing an on-line savings account page according to one embodiment.

FIG. 3 is a flowchart 300 showing a process for setting up a savings account according to one embodiment. At step 302, the user logs into a financial account, such as a credit card account, a bank account, or a payment provider account, such as with PayPal, Inc. The login process can be by any suitable method. For example, the user may enter a user identifier, such as a user name or email address, and a password or PIN. Next, the user accesses the user's savings account at step 304. This may be by simply clicking on a savings account link on the user account page or by entering the same or new login information for the savings account. Note that in one embodiment, the user may bypass step 302 and access the savings account directly, such as by entering a user identifier and password/PIN from an appropriate site.

Once at the savings account page, the user may then select a funding source at step 306. The user may enter the requested information for one or more funding sources, such as a bank account number, routing number, credit card number, billing address, social security number, etc. The funding source may be with the savings account provider or a third party. If the former, the user may simply need to select an appropriate option, without entering the additional information required for a third party funding source. If the latter, the savings account provider may first verify that the selected funding source is proper by any conventional method. If a funding source has already been selected and the user does not wish to change the funding source, this step may be skipped.

Next, the user sets a savings rate at step 308. This can be done initially to set up a savings rate or subsequently if the user wishes to change the savings rate. The savings rate may include a dollar amount and a period, e.g., X dollars/week. In one embodiment, the user may set different savings rates from different funding sources. Once set, at each time period, the designated amount may be automatically withdrawn from the appropriate funding source and deposited into the user's savings account.

At step 310, the user selects an item the user wishes to save for. As discussed above, item selection can be manual entry, by searching and selecting, or any other suitable means. Step 310 may also include setting the price or savings goal for the selected item, which may be automatic (such as from a search and selection) or manually input by the user. Item selection may further include a link or designation of a specific merchant offering the item. If the user wishes to change any parameters of the item, as determined at step 312, the user may do so at step 314, such as changing a value of the item, changing a desired merchant, deleting the item, changing the quantity of the item, etc. The user may then set a priority for the item at step 316, such as from a drop down menu or entering a priority number.

Next, the user, at step 318, may set a desired time to reach the savings goal to purchase the item. The time entry may be with a pop-up calendar or the user may enter an actual month, day, and year. The user may also enter the number of days as the time. In other embodiments, the time to reach the savings goal may be automatically calculated by the system using the item price and the savings rate for that item (taking into consideration the priority of the item). Optionally, at step 320, the user may designate a specific funding source for the item, which may involve the same or similar process as with steps 306 and 308 described above. For example, the user may wish to only fund this item with a different funding source than the other items. If there are more items to add to the savings account, as determined at step 322, the process continues back at step 310. Note that the various steps described above and herein may be combined or performed in different order as appropriate.

Figure 4:
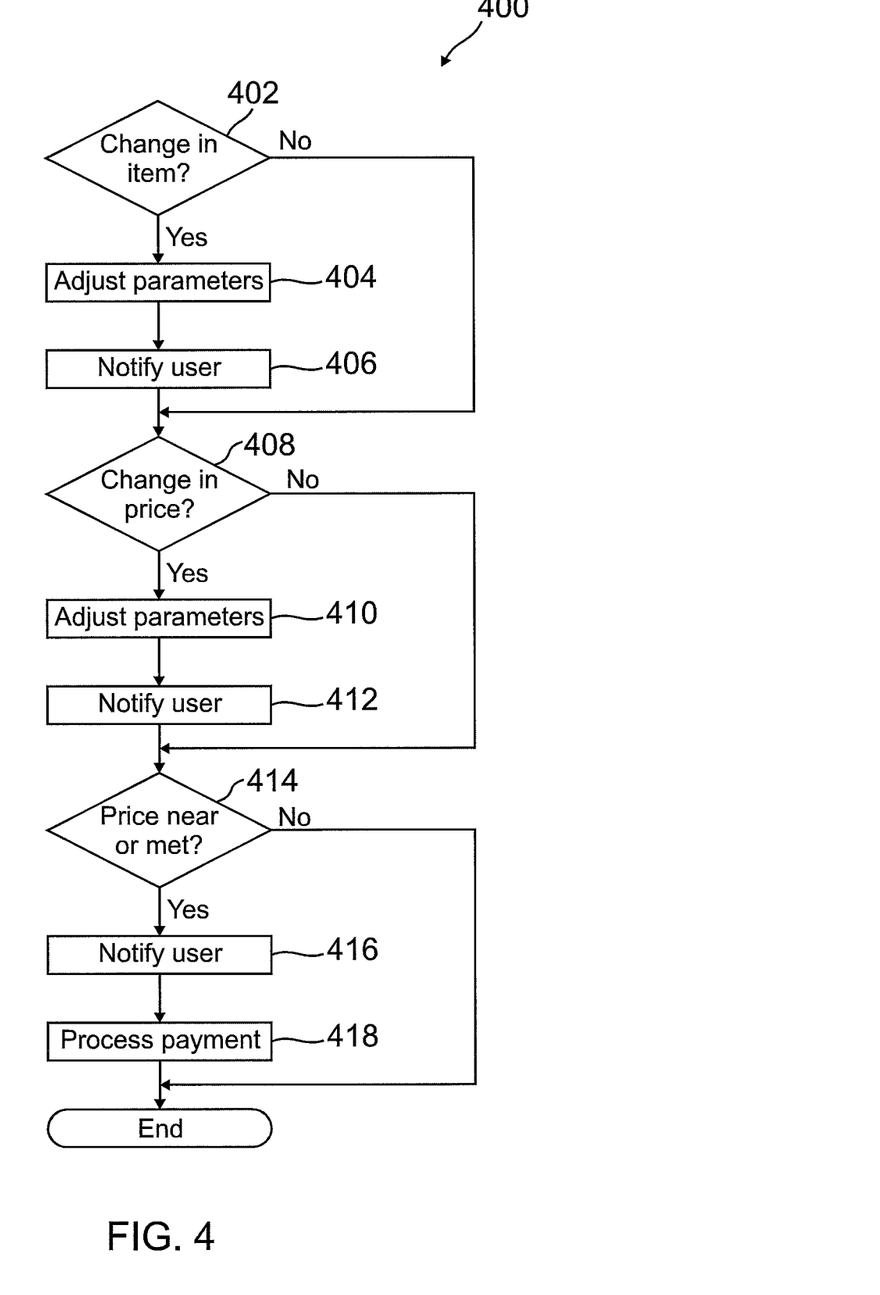
FIG. 4 is a flowchart showing a process for updating a savings account page or notifying a user of changes regarding items on the account page according to one embodiment.

FIG. 4 is a flowchart 400 showing a process for updating a savings account and notifying the user of different events according to one embodiment. At step 402, with the savings account set up, the system determines if there has been a change to an item. This may include the user manually changing a parameter, such as quantity (delete the item, increase the quantity, or decrease the quantity) or adding a new item. The system may also obtain any item change information through its own, such as monitoring if and when something about the item has changed. This may include low inventory on the item, a new version or model being introduced, a recall on the item, a selected merchant has stopped offering the item, etc. If something about the item has changed, the system may adjust the necessary parameters at step 404, such as adjusting the time to reach the item price goal, changing a merchant, etc. The user is then notified, at step 406, of the change Notification can be an alert to the user that a particular item has changed and to access the savings account for details. Notification can also be a description of the change. Both can be done in different ways, such as text, email, automate phone call, etc.

The system may also determine if a change in price has occurred for an item at step 408, such as the user manually changing an item price or the system detecting an increase in price, a decrease in price, a sale from a particular merchant (ether on-line or local), a special offer on the item, etc. Once a price change has been detected, one or more parameters in the user's savings account may be adjusted, at step 410, if needed to reflect the change, including, but not limited to price, time to reach the price goal, name of merchant offering the item at the price, text notes, etc. The user can then be notified of the price change, similar to notification of an item change in step 406.

The savings account provider system, such as by payment provider like PayPal, Inc., can monitor when a savings goal has been reached or is close to being reached. This can be an input from the user, e.g., the user may request that a notification be sent when a goal is reached or when a goal is expected to be reached within a specific number of days or saving periods. This may also be an automatic function provided by the system without requiring input from the user. Depending on the triggering event, the system determines when the user's savings have met or is about to meet a savings goal or price for an item at step 414. When this is detected, the user may be notified at step 416, where notification may be similar to the notification described in step 406 above. If the user decides to make the purchase, either at this time or at a later date, the system processes the payment at step 418. Note that the payment process may be performed at any time and after each user notification step, not just notification step 416.

Payment processing can be done in any number of methods. In one embodiment, when the user decides to purchase the item (such as by clicking on a link associated with the item in the savings account page), the user may be asked simply to confirm the funds transferred from the savings account to a merchant account. The user may also be given the option of payment using a different funding source, which may then require the user to enter specific requested information about the funding source.

Figure 5:
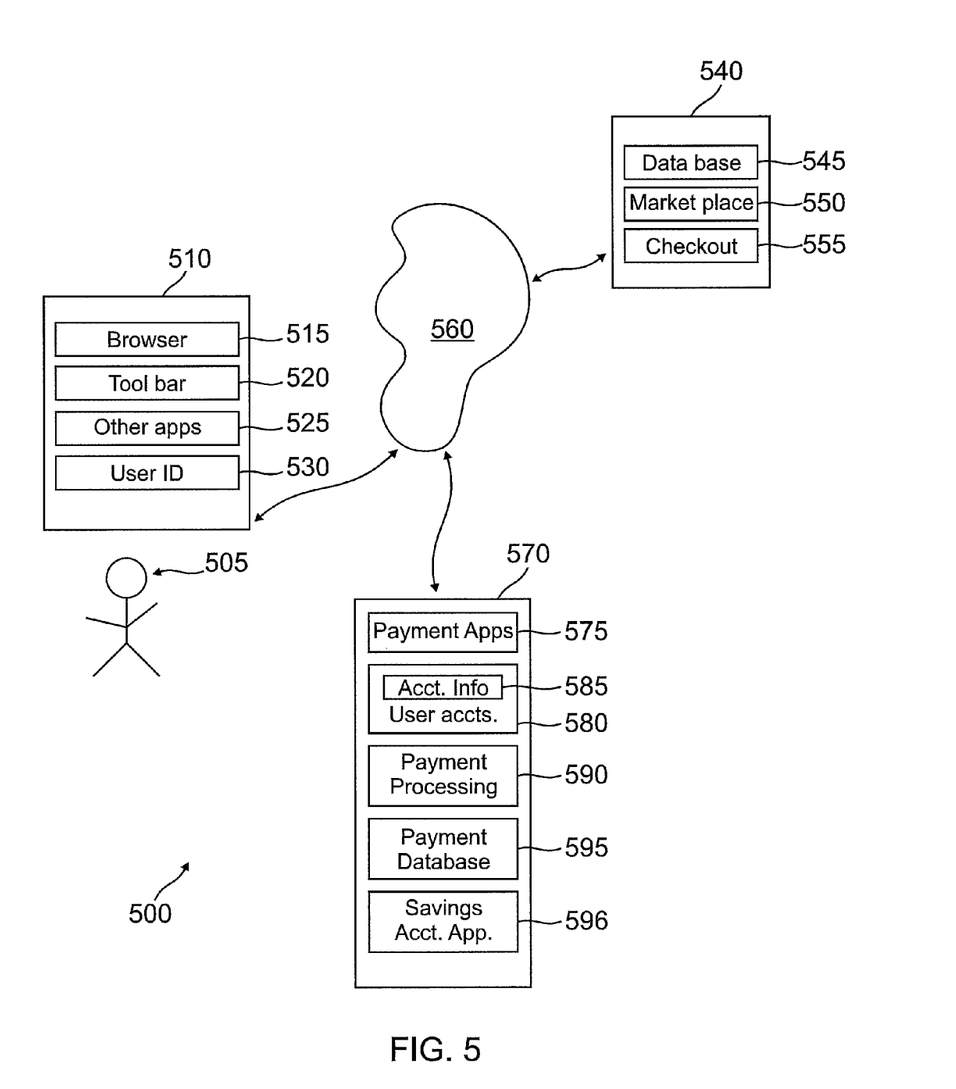
FIG. 5 is a block diagram of a networked system utilizing an on-line savings account page.

FIG. 5 is a block diagram of a networked system 500 that can be used with an on-line savings account, such as described above, in accordance with an embodiment of the invention. System 500 includes a user or consumer device 510, a merchant server 540, and a payment service provider server 570 in communication over a network 560. Payment service provider server 570 may be maintained by a payment provider, such as PayPal, Inc. of San Jose, Calif., which also manages and supports the on-line savings account that can be viewed from user device 510.

User device 510, merchant server 540, and payment service provider server 570 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

Network 560 may be implemented as a single network or a combination of multiple networks. For example, in various embodiments, network 560 may include the Internet or one or more intranets, landline networks, wireless networks, and/or other appropriate types of networks.

User device 510 may be implemented using any appropriate combination of hardware and/or software configured for wired and/or wireless communication over network 560. For example, in one embodiment, user device 510 may be implemented as a personal computer, equipped with or capable of receiving data from a scanner and/or camera, of a user 505 in communication with the Internet. In other embodiments, user device 510 may be implemented as a wireless telephone, personal digital assistant (PDA), notebook computer, and/or other types of computing devices equipped with a display for showing the savings account.

As shown, user device 510 may include one or more browser applications 515 which may be used, for example, to provide a convenient interface to permit user 505 to browse information available over network 560. For example, in one embodiment, browser application 515 may be implemented as a web browser configured to view information available over the Internet, access an on-line savings account, and perform a financial transaction. User device 510 may also include one or more toolbar applications 520 which may be used, for example, to provide client-side processing for performing desired tasks in response to operations selected by user 505. In one embodiment, toolbar application 520 may display a user interface in connection with browser application 515 as further described herein to access a payment provider account and/or a savings account.

User device 510 may further include other applications 525 as may be desired in particular embodiments to provide desired features to user device 510. For example, such other applications 525 may include security applications for implementing client-side security features, programmatic client applications for interfacing with appropriate application programming interfaces (APIs) over network 560, or other types of applications. Applications 525 may also include email and texting applications that allow user 505 to send and receive emails and texts through network 560, such as notifications or descriptions of item or price changes of selected savings items. User device 510 includes one or more user identifiers 530 which may be implemented, for example, as operating system registry entries, cookies associated with browser application 515, identifiers associated with hardware of user device 510, or other appropriate identifiers, such as used for payment/user/device authentication. In one embodiment, user identifier 530 may be used by a payment service provider to associate user 505 with a particular account maintained by the payment service provider as further described herein.

Merchant server 540 may be maintained, for example, by an on-line merchant offering various products and/or services that the user may be saving for. Merchant server 540 may include a database 545 identifying available products and/or services (e.g., collectively referred to as items) which may be made available for viewing, selection, and purchase by user 505, such as when selected from the savings account page. Accordingly, merchant server 540 also includes a marketplace application 550 which may be configured to serve information over network 560 to browser 515 of user device 510. In one embodiment, user 505 may interact with marketplace application 550 through browser applications over network 560 in order to view various products or services identified in database 545, using data from a captured product code.

Merchant server 540 also includes a checkout application 555 which may be configured to facilitate the purchase by user 505 of goods or services identified by marketplace application 550 or through the savings page. Checkout application 555 may be configured to accept payment information from user 505 and/or from payment service provider server 570 over network 560.

Payment service provider server 570 may be maintained, for example, by an online payment service provider which may provide payment on behalf of user 505 to the operator of merchant server 540. Payment service provider server 570 may include one or more payment applications 575 which may be configured to interact with user device 510 and/or merchant server 540 over network 560 to facilitate the purchase of goods or services by user 505 of user device 510 from merchant server 540. In one embodiment, payment service provider server 570 may be provided by PayPal, Inc.

Payment service provider server 570 also maintains a plurality of user accounts 580, each of which may include account information 585 associated with individual users. For example, account information 585 may include private financial information of users of devices such as account numbers, passwords, phone numbers, credit card information, bank information, or other financial information which may be used to facilitate online transactions by user 505. Advantageously, payment application 575 may be configured to interact with merchant server 540 on behalf of user 505 during a transaction with checkout application 555 to track and manage purchases made by users.

Payment application 575 may include a mobile payment processing application 590 which may be configured to receive information from a mobile user device and/or merchant server 540 for storage in a payment database 595. Mobile payment application 590 may be further configured to match data received from a mobile device with information stored in payment database 595 for payment authentication and processing. As discussed this data may include the user's device phone number, email, password, and/or PIN.

Payment service provider server 570 may further include a savings account application 596 which may be configured to create, maintain, and manage an on-line savings account for the user, such as described above. Savings account application 596 may also be configured to monitor, detect, or otherwise track merchants, items, and other information available on-line to perform one or more of the services or functions described above. In one embodiment, savings account application 596 may be configured to perform the steps described above for creating a savings account, maintaining and modifying the savings account, and receive/transmit messages about items.

Figure 6:
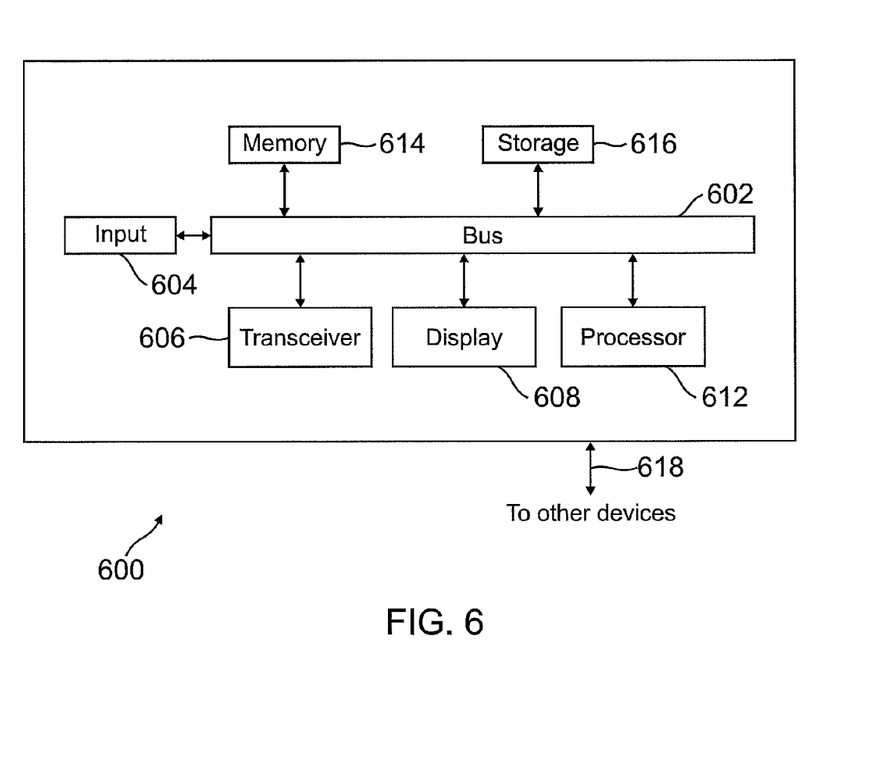
FIG. 6 is a block diagram of a computer system according to one embodiment for implementing one or more structures in FIG. 5.

FIG. 6 is a block diagram of a computer system 600 suitable for implementing one or more embodiments of the present disclosure. In various implementations, the user device may comprise a personal computing device (e.g., a personal computer, laptop, cell phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 600 in a manner as follows.

Computer system 600 includes a bus 602 or other communication mechanism for communicating information data, signals, and information between various components of computer system 600. Components include an input component 604 that processes a user action, such as selecting keys from a keypad/keyboard, selecting one or more buttons or links, etc., and sends a corresponding signal to bus 602. A transceiver 606 transmits and receives signals between computer system 600 and other devices, such as a merchant server, payment provider server, or another user device. In one embodiment, the transmission is wireless, although other transmission mediums and methods may also be suitable. A display 608, such as an LCD screen, display an image, such as the savings account page. A processor 612, which can be a micro-controller, digital signal processor (DSP), or other processing component, processes these various signals, such as for display on computer system 600 or transmission to other devices via a communication link 618. Processor may determine saving rates and other data as needed for the savings page. Selections by the user for savings, purchase, searching, etc. may be processed by processor 612.

Components of computer system 600 also include a system memory component 614 (e.g., RAM) and a static storage component 616 (e.g., ROM). Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. The savings account page is described primarily as a web page, but the savings account and/or savings account page can be an application (such as an iPhone® App), a desktop widget, or something similar that may be easily accessible to the user. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for displaying a savings plan on a user interface comprising:
   presenting, on the user interface, a plurality of items, a purchase price for each of the plurality of items, and a savings prioritization for each of the plurality of items, the respective purchase price and savings prioritization being used to define a savings rate for each of the plurality of items;
   receiving user input, through the user interface, that changes the savings prioritization for at least one of the plurality of items;
   in response to receiving the user input, calculating a new savings rate for at least one of the plurality of items;
   updating the user interface to present the new savings rate for the at least one of the plurality of items;
   periodically detecting and updating the purchase price for each of the plurality of items, wherein updating the purchase price for each of the plurality of items comprises monitoring a merchant on-line through a link provided by a user for at least one of the plurality of items; and
   in response to detecting a purchase price increase for the at least one of the plurality of items based on the periodically detecting the purchase price, increasing the savings rate for the at least one of the plurality of items to meet a purchase deadline.

2. The method of claim 1,
   wherein the savings prioritizations include a desired purchase date for each of the plurality of items; and
   wherein the receiving the user input that changes the savings prioritization includes receiving an updated desired purchase date.

3. The method of claim 1,
   wherein the savings prioritizations include a purchase priority for each of the plurality of items; and
   wherein the receiving the user input that changes the savings prioritization includes receiving a change in purchase priority.

4. The method of claim 1, further comprising presenting, on the user interface, the link to purchase one of the plurality of items.

5. The method of claim 1, further comprising updating the savings rate for one or more of the plurality of items in response to a computer system automatically detecting a priority change.

6. The method of claim 1, further comprising notifying the user when a savings goal is reached.

7. The method of claim 1, further comprising notifying the user of a change to the savings plan.

8. The method of claim 1, further comprising receiving user input, through the user interface, that removes one of the plurality of the items from the savings plan.

9. The method of claim 8, further comprising redistributing funds allocated to the removed item to at least one of the remaining items.

10. A system for displaying a savings plan on a user interface, comprising:
   non-transitory memory storing instructions; and
   one or more hardware processors coupled to the non-transitory memory and configured to read the instructions from the non-transitory memory to cause the system to perform operations comprising:
   present, on a user interface, a plurality of items a user wishes to save for, a total amount to be saved, a priority for each of the plurality of items, a purchase price for each of the plurality of items, and a savings prioritization for each of the plurality of items, the respective purchase price and savings prioritization being used to define a savings rate for each of the plurality of items;
   receive user input, through the user interface, that changes at least one of a price or quantity for at least one of the plurality of items;
   in response to receiving the user input, calculating at least one of a new desired purchase date or new savings amount for at least one of the plurality of items;
   update the user interface to present the new desired purchase date or new savings amount for the at least one of the plurality of items; and
   periodically detect and update the purchase price for each of the plurality of items, wherein updating the purchase price for each of the plurality of items comprises monitoring a merchant on-line through a link provided by the user for at least one of the plurality of items; and
   in response detecting a purchase price increase for the at least one of the plurality of items based on the periodically detecting the purchase price, increasing the savings rate for the at least one of the plurality of items to meet a purchase deadline.

11. The system of claim 10, wherein the one or more processors are further configured to cause the system to notify the user when one of the plurality of items has low inventory.

12. The system of claim 11, wherein the notifying comprises transmitting specific merchant information to the user.

13. The system of claim 10, wherein the one or more processors are further configured to cause the system to present, on the user interface, a search field for locating and selecting at least one of the plurality of items.

14. The system of claim 10, wherein the one or more processors are further configured to cause the system to present, on the user interface, the link to purchase one of the plurality of items when a savings goal is reached.

15. The system of claim 14, wherein the one or more processors are further configured to cause the system to process a payment when the link is selected.

16. A non-transitory machine-readable medium having stored thereon machine readable instructions executable to cause a machine machine to perform operations comprising:
   presenting, on a user interface, a plurality of items, a purchase price for each of the plurality of items, and a savings prioritization for each of the plurality of items, the respective purchase price and savings prioritization being used to define a savings rate for each of the plurality of items;
   receiving user input, through the user interface, that changes at least one of a price, savings rate, or savings goal for at least one of the plurality of items;
   in response to receiving the user input, calculating a new desired purchase date for the at least one of the plurality of items;
   updating the user interface to present the new desired purchase date for the at least one of the plurality of items; and
   periodically detecting and updating the purchase price for each of the plurality of items, wherein updating the purchase price for each of the plurality of items comprises monitoring a merchant on-line through a link provided by a user for at least one of the plurality of items; and
   in response to detecting a purchase price increase for the at least one of the plurality of items based on the periodically detecting the purchase price, increasing the savings rate for the at least one of the plurality of items to meet a purchase deadline.

17. The non-transitory machine-readable medium of claim 16, wherein the operations further comprise automatically detecting a change in priority, or quantity for one of the plurality of items.

18. The non-transitory machine-readable medium of claim 17, wherein the operations further comprise, in response to the detection, automatically changing the savings rate of the one of the plurality of items.

19. The non-transitory machine-readable medium of claim 16, wherein the operations further comprise notifying the user when one of the plurality of items has low inventory, a price increase, a price decrease, a sale price, or a special offer.

20. The non-transitory machine-readable medium of claim 19, wherein notifying comprises transmitting specific merchant information to the user.

* * * * *